(12) United States Patent
Pollard

(10) Patent No.: US 7,754,999 B2
(45) Date of Patent: Jul. 13, 2010

(54) LASER MICROMACHINING AND METHODS OF SAME

(75) Inventor: Jeffrey R. Pollard, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1373 days.

(21) Appl. No.: 10/437,378

(22) Filed: May 13, 2003

(65) Prior Publication Data

US 2004/0227794 A1    Nov. 18, 2004

(51) Int. Cl.
    B23K 26/14    (2006.01)
(52) U.S. Cl. ............... 219/121.69; 219/121.84; 29/25.01; 438/940; 347/47
(58) Field of Classification Search ........... 219/121.61, 219/121.62, 121.67–121.72, 121.83, 121.84; 438/940; 29/25.01, 592.1; 347/47
    See application file for complete search history.

(56) References Cited

U.S. PATENT DOCUMENTS

| | | | |
|---|---|---|---|
| 2,841,477 A | 7/1958 | Hall | |
| 3,364,087 A | 1/1968 | Raymond | |
| 3,571,555 A | 3/1971 | Townes | |
| 3,685,882 A * | 8/1972 | Van Der Jagt | 359/509 |
| 3,866,398 A * | 2/1975 | Vernon et al. | 134/1.3 |
| 4,260,649 A | 4/1981 | Dension et al. | |
| 4,331,504 A | 5/1982 | Chuang et al. | |
| 4,332,999 A | 6/1982 | Wittke | |
| 4,467,168 A | 8/1984 | Morgan et al. | |
| 4,530,187 A * | 7/1985 | Koide et al. | 451/5 |
| 4,532,401 A | 7/1985 | Shiozaki et al. | |
| 4,643,799 A | 2/1987 | Tsujii et al. | |
| 4,731,158 A | 3/1988 | Brannon | |
| 4,801,352 A | 1/1989 | Piwczyk | |
| 4,913,405 A | 4/1990 | Van Der Have et al. | |
| 4,925,523 A | 5/1990 | Braren et al. | |
| 5,120,926 A * | 6/1992 | Marriott | 219/121.67 |
| 5,164,324 A | 11/1992 | Russell et al. | |
| 5,266,532 A | 11/1993 | Russell et al. | |
| 5,322,988 A | 6/1994 | Russell et al. | |
| 5,328,517 A | 7/1994 | Cates et al. | |
| 5,345,057 A | 9/1994 | Muller | |
| 5,348,609 A | 9/1994 | Russell et al. | |
| 5,354,420 A | 10/1994 | Russell et al. | |
| 5,361,268 A * | 11/1994 | Fossey et al. | 372/23 |
| 5,362,450 A | 11/1994 | Russell et al. | |

(Continued)

FOREIGN PATENT DOCUMENTS

DE    004336010 A1 *    4/1994

(Continued)

OTHER PUBLICATIONS

Translation of JP401057994A, Method and Device for Laser Beam Processing, Seiichi Hayashi, et al., 10 sheets.*

(Continued)

*Primary Examiner*—Samuel M Heinrich

(57) ABSTRACT

The described embodiments relate to laser micromachining a substrate. One exemplary embodiment removes substrate material from a substrate to a first depth relative to a first surface of the substrate while delivering an assist gas at a first flow rate; and, removes substrate material at a second greater depth while delivering the assist gas at a second higher flow rate.

34 Claims, 8 Drawing Sheets

U.S. PATENT DOCUMENTS

| | | | |
|---|---|---|---|
| 5,380,976 A * | 1/1995 | Couch et al. ........... 219/121.44 |
| 5,385,633 A | 1/1995 | Russell et al. |
| 5,387,314 A | 2/1995 | Baughman et al. |
| 5,443,033 A | 8/1995 | Nishizawa et al. |
| 5,451,378 A | 9/1995 | Russell et al. |
| 5,493,445 A | 2/1996 | Sexton et al. |
| 5,501,893 A | 3/1996 | Laermer et al. |
| 5,504,301 A | 4/1996 | Eveland |
| 5,531,857 A | 7/1996 | Engelsberg et al. |
| 5,591,285 A | 1/1997 | Afzali-Ardakani |
| 5,608,436 A | 3/1997 | Baughman et al. |
| 5,609,781 A * | 3/1997 | Kaga et al. ............ 219/121.84 |
| 5,632,083 A * | 5/1997 | Tada et al. .................... 29/827 |
| 5,639,314 A * | 6/1997 | Kura et al. .................. 136/244 |
| 5,643,472 A | 7/1997 | Engelsberg et al. |
| 5,669,979 A | 9/1997 | Elliott et al. |
| 5,688,415 A * | 11/1997 | Bollinger et al. ....... 219/121.41 |
| 5,688,418 A * | 11/1997 | Yoshiyasu et al. ...... 219/121.71 |
| 5,688,715 A | 11/1997 | Sexton et al. |
| 5,716,495 A | 2/1998 | Butterbaugh et al. |
| 5,750,954 A * | 5/1998 | White et al. ........... 219/121.45 |
| 5,760,368 A | 6/1998 | Nakata et al. |
| 5,814,156 A | 9/1998 | Elliott et al. |
| 5,818,009 A | 10/1998 | Nakata et al. |
| 5,837,964 A * | 11/1998 | Emer et al. ............ 219/121.71 |
| 5,869,803 A | 2/1999 | Noguchi et al. |
| 5,874,011 A | 2/1999 | Ehrlich |
| 5,877,392 A | 3/1999 | Russell et al. |
| 5,904,865 A * | 5/1999 | Jariabek ................... 219/69.13 |
| 5,912,186 A | 6/1999 | Yoshino et al. |
| 5,935,464 A | 8/1999 | Dulaney et al. |
| 5,986,234 A | 11/1999 | Matthews et al. |
| 6,008,144 A | 12/1999 | Shih et al. |
| 6,060,685 A * | 5/2000 | Chou et al. ............ 219/121.83 |
| 6,074,957 A | 6/2000 | Donohoe et al. |
| 6,118,097 A * | 9/2000 | Kaga et al. ............ 219/121.84 |
| 6,136,096 A | 10/2000 | Morishige |
| 6,144,010 A | 11/2000 | Tsunemi et al. |
| 6,156,676 A * | 12/2000 | Sato et al. ................... 438/798 |
| 6,204,475 B1 | 3/2001 | Nakata et al. |
| 6,284,148 B1 | 9/2001 | Laermer et al. |
| 6,294,754 B1 * | 9/2001 | Nagura et al. .......... 219/121.63 |
| 6,306,772 B1 * | 10/2001 | Lin et al. .................... 438/714 |
| 6,331,258 B1 | 12/2001 | Silverbrook |
| 6,339,205 B1 | 1/2002 | Nakayama |
| 6,376,797 B1 * | 4/2002 | Piwczyk et al. ........ 219/121.72 |
| 6,384,371 B1 | 5/2002 | Hinei et al. |
| 6,400,389 B1 | 6/2002 | Shaffer et al. |
| 6,417,487 B2 * | 7/2002 | Nagura et al. .......... 219/121.84 |
| 6,423,921 B2 * | 7/2002 | Beyer et al. ............ 219/121.44 |
| 6,423,928 B1 | 7/2002 | Piwczyk |
| 6,448,534 B1 | 9/2002 | Kobsa |
| 6,472,295 B1 | 10/2002 | Morris et al. |
| 6,475,575 B1 * | 11/2002 | Ikuta et al. ..................... 428/14 |
| 6,492,617 B2 * | 12/2002 | Nagahori et al. ....... 219/121.84 |
| 6,720,519 B2 * | 4/2004 | Liu et al. ............... 219/121.61 |
| 6,849,151 B2 * | 2/2005 | Barnes et al. ........... 156/345.24 |
| 6,969,822 B2 * | 11/2005 | Pollard .................. 219/121.84 |
| 2002/0017514 A1 | 2/2002 | Lambert |
| 2002/0040894 A1 | 4/2002 | Borstel |
| 2002/0086544 A1 | 7/2002 | Boyle |
| 2002/0088780 A1 | 7/2002 | Boyle et al. |
| 2002/0108938 A1 | 8/2002 | Patel |
| 2002/0130116 A1 | 9/2002 | Lawson |
| 2002/0170891 A1 | 11/2002 | Bagle et al. |
| 2003/0062126 A1 | 4/2003 | Scaggs |
| 2004/0035529 A1 * | 2/2004 | Grimbergen ........... 156/345.24 |
| 2004/0094525 A1 * | 5/2004 | Weick et al. ........... 219/121.83 |

FOREIGN PATENT DOCUMENTS

| | | | |
|---|---|---|---|
| EP | 0930168 A1 | 7/1999 |
| JP | 61289991 A * | 12/1986 |
| JP | 83285182 | 11/1988 |
| JP | 401057994 A * | 3/1989 |
| JP | 403225303 A * | 10/1991 |
| JP | 04176177 A * | 6/1992 |
| JP | 8308989 | 11/1994 |
| JP | 8078405 | 3/1996 |
| JP | 11104879 | 4/1999 |
| JP | 02001150172 A * | 6/2001 |
| JP | 02001274485 A * | 10/2001 |
| RU | 2025244 C1 * | 12/1994 |
| WO | WO 01/10177 | 2/2001 |
| WO | WO 02/34455 | 5/2002 |
| WO | WO 02/47863 | 6/2002 |
| WO | WO 02/076666 | 10/2002 |

OTHER PUBLICATIONS

Translation of JP02001150172A, Laser Beam Cutting Device, Kumeo Iida, et al., 27 sheets.*

Translation of JP61289991, Laser Beam Machine, Masayuki Kanbara, 8 sheets.*

PCT International Search Report (PCT/US2004/013160).

* cited by examiner

LASER MICROMACHINING AND METHODS OF SAME

BACKGROUND

The market for electronic devices continually demands increased performance at decreased costs. In order to meet these requirements the components which comprise various electronic devices must be made ever more efficiently and to closer tolerances.

Laser micromachining is a common production method for controlled, selective removal of material. However, a desire exists to enhance laser machining performance.

BRIEF DESCRIPTION OF THE DRAWINGS

The same components are used throughout the drawings to reference like features and components.

DETAILED DESCRIPTION OF THE PREFERRED EMBODIMENTS

Overview

The embodiments described below pertain to methods and systems for laser micromachining a substrate. Laser micromachining is a production method for controlled, selective removal of substrate material. By removing substrate material, laser micromachining can form a feature into the substrate. Such features can be either through features, such as a slot, which pass through the substrate's thickness, or blind features, such as a trench, which pass through a portion of the substrate's thickness.

In one exemplary embodiment, the laser micromachining process utilizes a laser machine that can generate a laser beam for energizing and otherwise removing substrate material to form a feature in the substrate.

In some embodiments, an assist gas can be supplied to promote substrate removal by the laser. The assist gas can react with energized substrate material to form compounds that are more readily removed and/or dissipated than could otherwise be achieved. Alternatively or additionally, the assist gas can carry away laser machining by-products, and/or otherwise enhance energy delivery to the substrate.

Examples of laser machining features will be described generally in the context of forming ink feed slots ("slots") in a substrate. Such slotted substrates can be incorporated into ink jet print cartridges or pens, and/or various microelectromechanical (MEMs) devices, among other uses. The various components described below may not be illustrated accurately as far as their size is concerned. Rather, the included figures are intended as diagrammatic representations to illustrate to the reader various inventive principles that are described herein.

Exemplary Products

Figure 1:
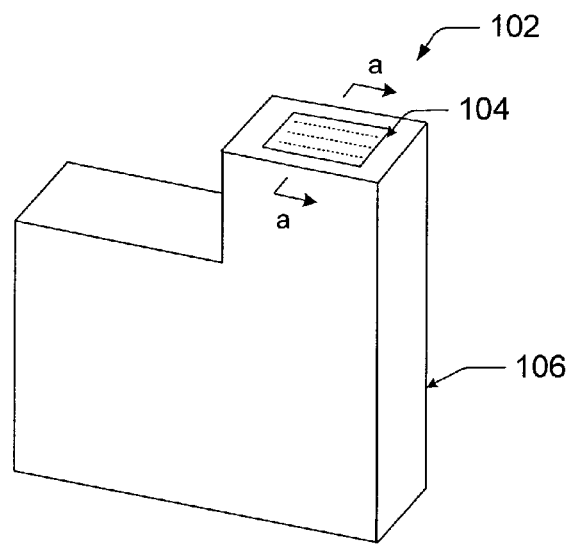
FIG. 1 shows a perspective view of a print cartridge in accordance with one exemplary embodiment.

FIG. 1 shows an exemplary print cartridge 102. The print cartridge is comprised of the print head 104 and the cartridge body 106. Other exemplary configurations will be recognized by those of skill in the art.

Figure 2:
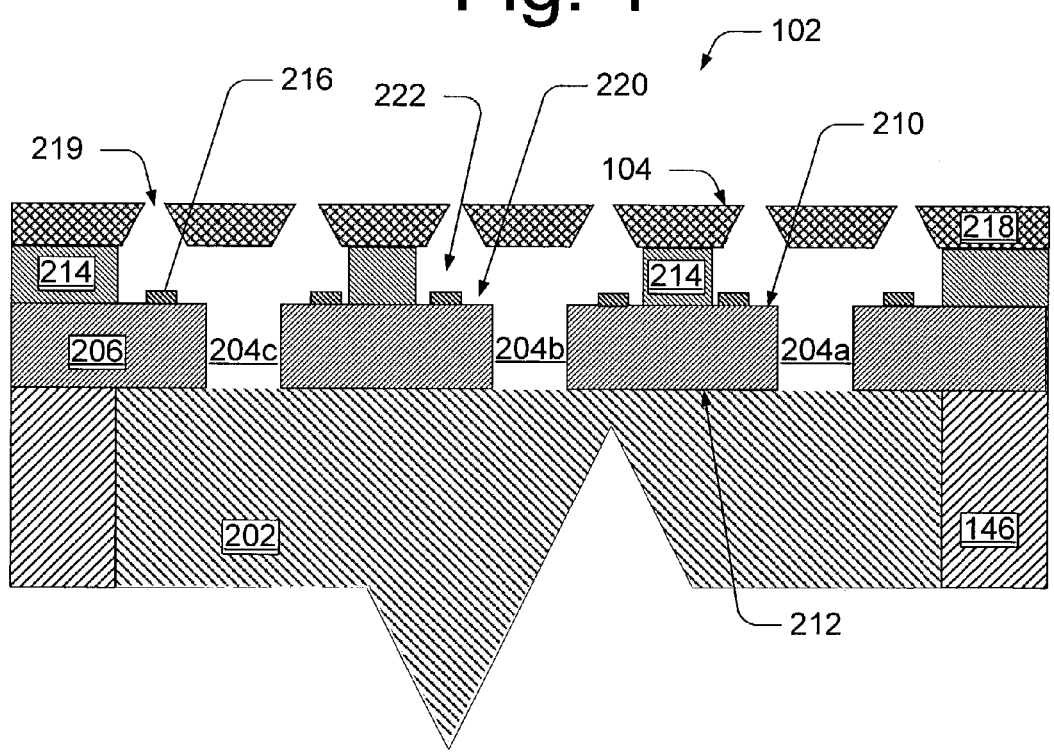
FIG. 2 shows a cross-sectional view of a portion of a print cartridge in accordance with one exemplary embodiment.

FIG. 2 shows a cross-sectional representation of a portion of exemplary print cartridge 102 taken along line a—a in FIG. 1. It shows the cartridge body 106 containing ink 202 for supply to the print head 104. In this embodiment, the print cartridge is configured to supply one color of ink to the print head, though other exemplary configurations can supply multiple colors and/or black ink. A number of different slots are provided, with three exemplary slots being shown at 204a, 204b, and 204c. Other exemplary embodiments can utilize more or less slots. Some exemplary embodiments can divide the ink supply so that each of the three slots 204a–204c receives a separate ink supply.

The various slots pass through portions of a substrate 206. In some embodiments, silicon can be a suitable substrate. In some of these embodiments, the substrate 206 comprises a crystalline substrate such as single crystalline silicon or polycrystalline silicon. Examples of other suitable substrates include, among others, gallium arsenide, glass, silica, ceramics or a semiconducting material. The substrate can comprise various configurations as will be recognized by one of skill in the art.

In this embodiment, substrate 206 has a first surface 210 and a second surface 212. Various layers formed above the second surface 212 are commonly referred to as "thin film layers". Also present in some embodiments, is a barrier layer 214. In one such embodiment, barrier layer 214 can surround independently controllable fluid ejection elements or fluid drop generators. In this embodiment, the fluid ejection elements comprise firing resistors 216. This is but one possible exemplary configuration of thin film layers, while other suitable examples will be discussed below.

Barrier layer 214 can comprise, among other things, a photo-polymer substrate. In some embodiments, an orifice plate 218 is positioned over the barrier layer. In one embodiment, the orifice plate comprises a nickel substrate. In another embodiment, the orifice plate is the same material as the barrier layer. The orifice plate can have a plurality of nozzles 219 through which fluid heated by the various resistors can be ejected for printing on a print media (not shown). The various layers can be formed, deposited, or attached upon the preceding layers. The configuration given here is but one possible configuration. For example, in an alternative embodiment, the orifice plate and barrier layer are integral.

The exemplary print cartridge 102 shown in FIGS. 1 and 2 is upside down from the common orientation during usage. When positioned for use, fluid (such as ink 202) can flow from the cartridge body 106 into one or more of the slots 204a–204c. From the slots, the fluid can travel through a fluid-handling passageway 220 that leads to an ejection chamber 222.

An ejection chamber 222 can be comprised of a firing resistor 216, a nozzle 219, and a given volume of space therein. Other configurations are also possible. When an electrical current is passed through the firing resistor in a given ejection chamber, the fluid can be heated to its boiling point so that it expands to eject a portion of the fluid from the nozzle 219. The ejected fluid can then be replaced by additional fluid from the fluid-handling passageway 220. Various embodiments can also utilize other ejection mechanisms, such as piezoceramic layers.

Exemplary Systems and Methods

Figure 3:
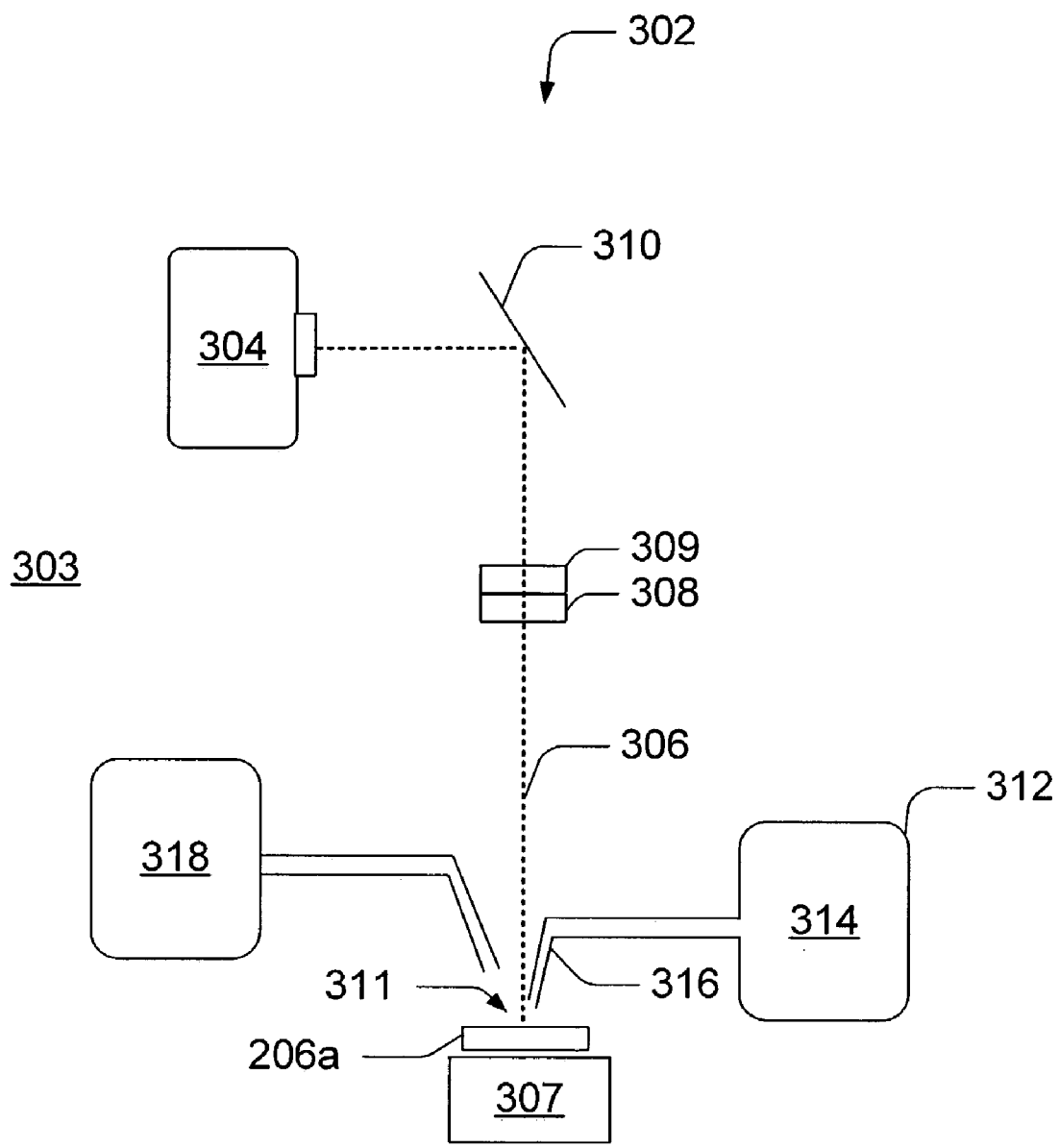
FIG. 3 shows a front elevational view of a laser machining apparatus in accordance with one exemplary embodiment.

FIG. 3 shows an exemplary apparatus or laser machine 302 capable of micromachining a substrate 206a in accordance with one exemplary embodiment. This exemplary laser machine can be configured for use in an open air environment or region 303. The laser machine can have a laser source 304 capable of emitting a laser beam 306. The laser beam can contact, or otherwise be directed at, the substrate 206a. In some exemplary embodiments, the substrate can be positioned on a fixture 307 for laser machining.

Exemplary laser machines can utilize various laser sources. A laser source has a crystal or other structure that when energized can emit the laser beam. An exemplary laser source is the Coherent AVIA 355-4500 which contains Crystalline NdYVO4 (also known as Vanadate). Other exemplary crystals include among others, Nd:YAG and Nd:YLF.

Each of these materials can produce a laser beam with a fundamental wavelength of about 1064 nanometers (nm) in one embodiment. Laser beams of various wavelengths can provide satisfactory embodiments. For example, some embodiments can have a wavelength in the range of less than about 550 nm.

In some exemplary embodiments, the wavelength of the laser beam can be modified within the laser source 304. For example, one embodiment can utilize the Coherent AVIA 355, where the frequency is tripled to yield a laser beam wavelength of 355 nm. Another exemplary embodiment can utilize a laser source with a wavelength of 532 nm. For example, the Lambda Physik PG532-15 can be utilized as a laser source that can provide a laser beam that has such a wavelength. Other exemplary embodiments can utilize laser beams having wavelengths ranging from less than 100 nm to more than 1500 nm. Other satisfactory embodiments can be achieved with laser beams having various properties as will be discussed in more detail below.

Various exemplary embodiments can utilize one or more lenses 308 to focus or expand the laser beam. In some of these exemplary embodiments, the laser beam can be focused in order to increase its energy density to more effectively machine the substrate. In these exemplary embodiments, the laser beam can be focused with one or more lenses 308 to achieve a desired diameter where the laser beam contacts the substrate 206a. In some of these embodiments, this diameter can range from about 5 micron to more than 100 microns. In one embodiment, the diameter is about 30 microns. Also, the laser beam can be pointed directly from the laser source 304 to the substrate 206a, or indirectly through the use of a galvanometer 309, and/or one or more mirror(s) 310.

Exemplary laser beams can provide sufficient energy to energize substrate material where the laser beam is directed. Energizing can comprise melting, vaporizing, exfoliating, phase exploding, ablating, reacting, and/or a combination thereof, among others processes. Some exemplary embodiments can energize substrate material equal to or above its material removal threshold. The material removal threshold is the energy density level used to remove substrate material by melting, vaporizing, exfoliating, and/or phase explosion. The substrate that the laser beam is directed at and the surrounding region containing energized substrate material is referred to in this document as an interface region 311.

In some exemplary embodiments, the laser machine 302 can also have a gas source 312 for supplying an assist gas 314 to the interface region 311. Examples of suitable assist gases will be discussed in more detail below.

In some exemplary embodiments, the assist gas can be supplied or introduced via one or more gas supply nozzles 316. Examples of some suitable nozzle configurations are described below.

Some exemplary embodiments can also utilize a debris extraction system 318 that can remove vaporized substrate materials and/or molecules formed from substrate material and a component of the assist gas, as well as various other molecules. In some embodiments, the debris extraction system can comprise a vacuum system and filtration system positioned to evacuate material in proximity to the laser beam and substrate. Exemplary debris extraction systems will be discussed in more detail below.

In some embodiments, assist gas can be supplied to increase the speed and/or efficiency at which the laser beam cuts or removes substrate material. Various mechanisms can contribute to the increased removal rate. For example, in some embodiments, molecules of the assist gas can be ionized by the laser beam energy. At least some of the resultant ions can react with energized substrate material. Such reactions can form resultant compounds that can be volatile and relatively non-reactive. These properties can allow the resultant compounds to diffuse, dissipate, or otherwise be removed from the interface region and thus can decrease the incidence of redeposition of substrate material and enhance the penetration of the laser beam to the substrate.

Figure 4A:
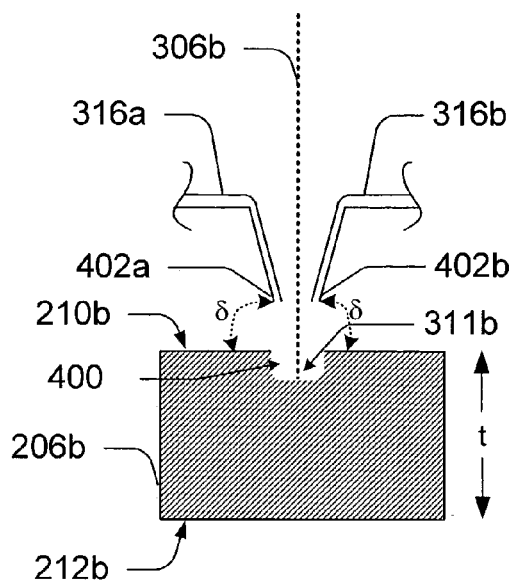
FIGS. 4a–4c show a cross-sectional view of a substrate in accordance with one exemplary embodiment.
Figure 4B:
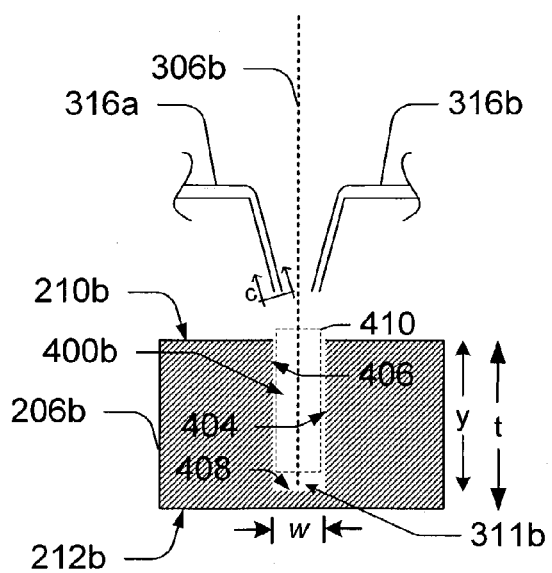
Figure 4C:
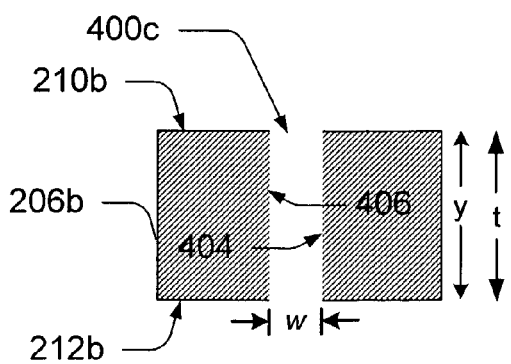

FIGS. 4a–4c show cross-sectional views through a substrate 206b. These views are taken transverse the substrate's long axis (not shown) which extends into and out of the page upon which the figures appear.

Substrate 206b has a thickness t defined by a first surface 210b and an opposite second surface 212b. Progressively more substrate material has been removed in the subsequent figures. In the embodiments shown in FIGS. 4a–4b removal of substrate material formed a blind feature (400, 400b respectively). In contrast, feature 400c shown in FIG. 4c extends all the way through the thickness of the substrate and hence is a through feature. Other exemplary blind and through features can also be formed as will be discussed below.

Referring now to FIG. 4a, laser beam 306b is shown directed at substrate 206b. As shown here, the laser beam is orthogonal to the first surface 210b of the substrate, though other configurations can provide satisfactory embodiments. The laser beam has formed a shallow feature 400 in the substrate through the first surface 210b.

In this embodiment, two gas assist nozzles (316a and 316b) are shown positioned on opposite sides of the laser beam to supply assist gas (not shown) to interface area 311b. Though two gas assist nozzles are utilized here, other satisfactory embodiments can utilize more or less nozzles. The term 'nozzle' is used to describe the hardware that is used to deliver the assist gas to the interface region of the substrate. In various embodiments, this can include an exit aperture (402a and 402b). In some embodiments the exit aperture can be generally circular in transverse cross-section taken parallel to plane c as shown in FIG. 4b.

In other exemplary embodiments, the exit aperture (402a and 402b) can comprise other configurations. For example, the exit aperture can be in a manifold configuration, an air knife configuration, and a ring shaped annulus configuration, among others.

In one exemplary embodiment, gas assist nozzles' exit aperture (402a and 402b) can be about 12 mm vertically above the first surface 210 and about 3.2 mm horizontally from the laser beam 306a, though other satisfactory embodiments position the nozzles at different combinations of distances and angles. Nozzles can be positioned to eject the assist gas from the exit aperture at an angle δ of about 45 to about 90 degrees relative to the first surface of the substrate. In the exemplary embodiment shown in FIGS. 4a–4b, the angle δ is about 70 degrees.

FIG. 4b is an exemplary embodiment showing another cross-section of the substrate where the laser has cut a feature 400b most of the way through the thickness t of the substrate 206b. The depth of the feature is indicated as y and can be compared to the substrate's thickness t. Feature 400b can be a finished blind feature comprising a blind via or additional substrate material can be removed to form a through feature, comprising a through via, an example of which is shown in FIG. 4c.

The configuration of feature 400b can utilize a given set or sets of laser machining conditions or parameters that can allow the laser to cut at generally the rate and efficiency as it did when the feature was shallower, for example as shown in FIG. 4a. Laser machining conditions will be described in more detail below. This embodiment can also allow the laser to cut a feature of generally uniform width w for the entire depth of the feature. The width w can be defined as extending between first sidewall 404 and second sidewall 406 where each sidewall is essentially orthogonal to first surface 210b.

A blind feature formed according to the described embodiments, can result in a feature having a bottom surface 408 that is essentially parallel to the first surface 210b. The combination of the bottom surface 408 being essentially parallel to the first surface and the sidewalls 404 and 406 being essentially equidistant from one another and orthogonal to the first surface allow feature 400b to approximate a portion of a rectangle as represented by dotted shape 410.

FIG. 4c shows feature 400c having been completed through the entire thickness t of the substrate. Depth y of the feature 400c equals the thickness t of the substrate 206b. As shown here, feature 400c is now a through via or slot and has a generally consistent width w throughout. In this configuration, feature 400c can resemble exemplary slots such as 204a–c described above in relation to FIG. 2.

Some embodiments can produce features, either blind or through, that have high aspect ratios (feature depth divided by the feature width). Some of the described embodiments can form features having aspect ratios of least about 10 with further embodiments having aspect ratios greater than 20. Thus, in the feature shown in FIG. 4b, the feature depth equals y and the feature width equals w. Referring again to FIG. 4c, feature depth y equals the substrate's thickness t. So in this embodiment, the aspect ratio equals the substrate's thickness t divided by the width w.

Figures 5A, 5B:
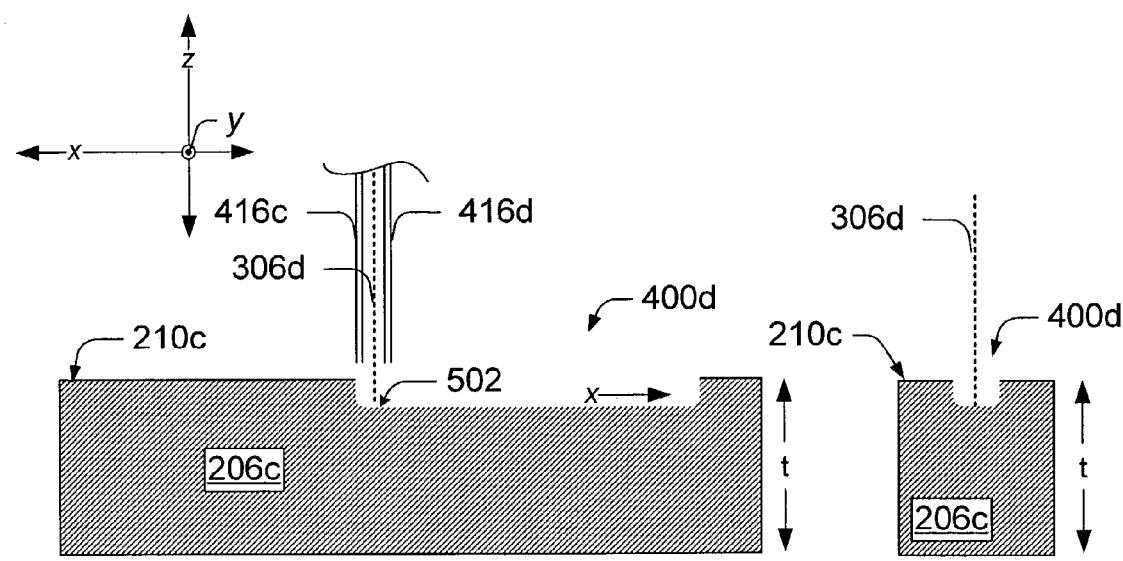
FIGS. 5a–5b show a cross-sectional view of a substrate in accordance with one exemplary embodiment.

FIGS. 5a–5b show a laser beam 306d cutting or removing substrate material 502 to form a blind feature (400d) comprising a trench. FIG. 5a is a view taken in cross-section along the long axis of the feature, while FIG. 5b is a cross-section taken transverse the long axis.

FIG. 5a shows a cross-section along the length of feature 400d formed by the laser beam 306d contacting the substrate 206c while the substrate was moved in the x direction relative to the laser beam. In another exemplary embodiment, the laser beam can be moved relative to the substrate in several ways. For example, the laser beam 306d can be moved, in either or both the x and y (into and out of the page) directions, while the substrate remains stationary.

The gas assist nozzles 416c and 416d can be moved in conjunction with the laser beam 306d or left stationary. Alternatively, the substrate 206c can be moved and the laser beam kept stationary. For example, in one embodiment, the substrate 206c can be placed on a fixture 307, shown in FIG. 3 that in some embodiments has the capability to move the substrate relative to the laser beam. Other exemplary embodiments can utilize a combination of these techniques, among others, to move the substrate and the laser beam relative to one another.

FIG. 5a shows gas assist nozzles 416c and 416d adjacent to and parallel to the laser beam 306d so that each of them is orthogonal to the substrate's first surface 210c. This is but one exemplary configuration that can supply assist gas to the interface area 311d.

Figure 6A:
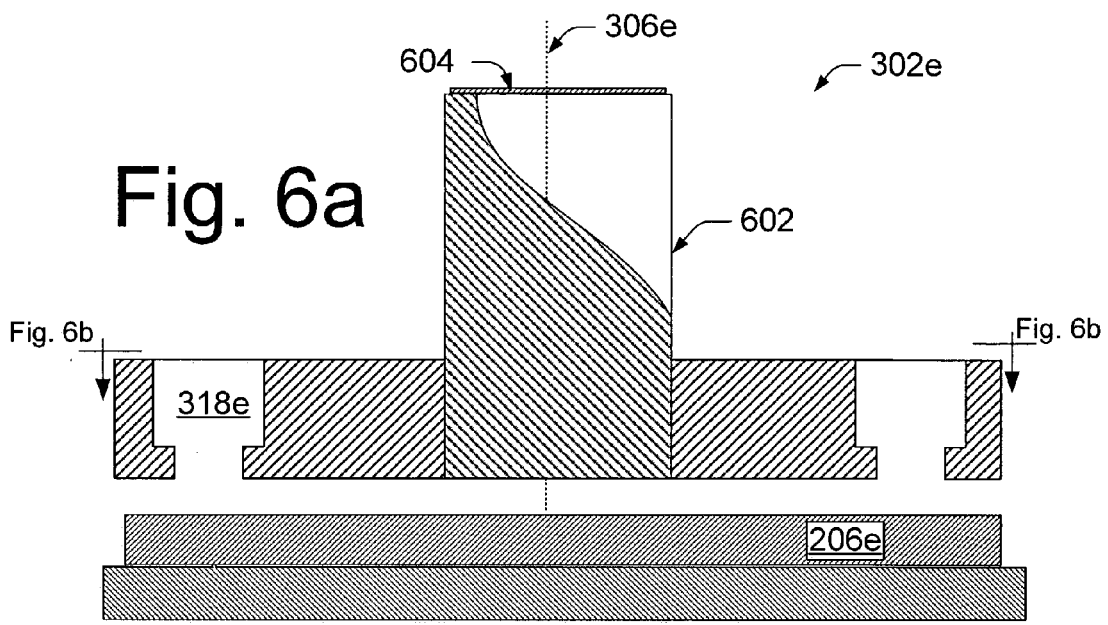
FIG. 6a shows a front elevational view of a portion of an exemplary laser machine in accordance with one exemplary embodiment.
Figure 6B:
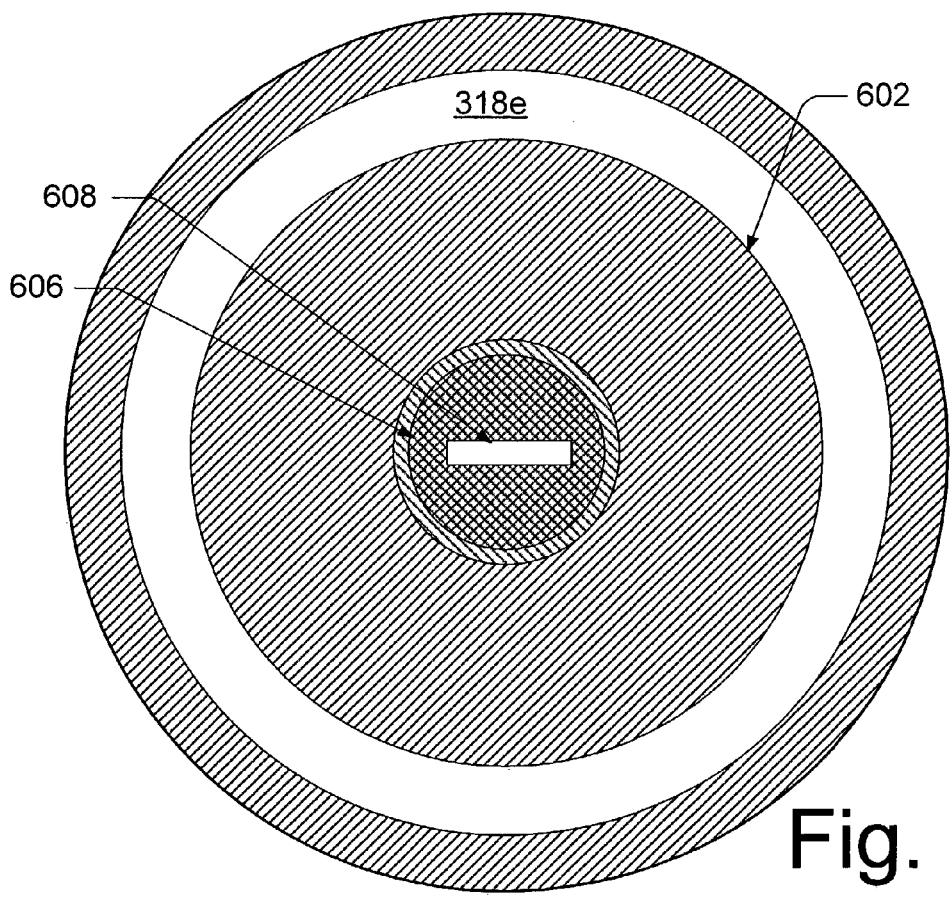
FIGS. 6b–6d show top views of portions of an exemplary laser machine in accordance with one exemplary embodiment.

FIGS. 6a–6d show another exemplary laser machine 302e for forming features in a substrate 206e in accordance with one embodiment. FIG. 6a shows a front elevational view, while FIG. 6b shows a cross-sectional view through portion of the laser machine as indicated in FIG. 6a.

As shown in FIGS. 6a–6b, exemplary laser machine 302e comprises a chamber 602 that has a window 604 positioned thereon. The laser machine also has a gas nozzle, which in this embodiment comprises a nozzle plate 606 that has a nozzle opening 608 formed therein. The laser machine also has an extraction system 318e comprising an exhaust vacuum.

In this embodiment, a substrate 206e is positioned proximate to, but not in chamber 602. A laser beam 306e can be directed through chamber 602 via window 604. The window can comprise an optical window comprising a treated quartz crystal, among others. The laser beam can exit chamber 602 toward the substrate 206e via nozzle opening 608.

Figure 6C:
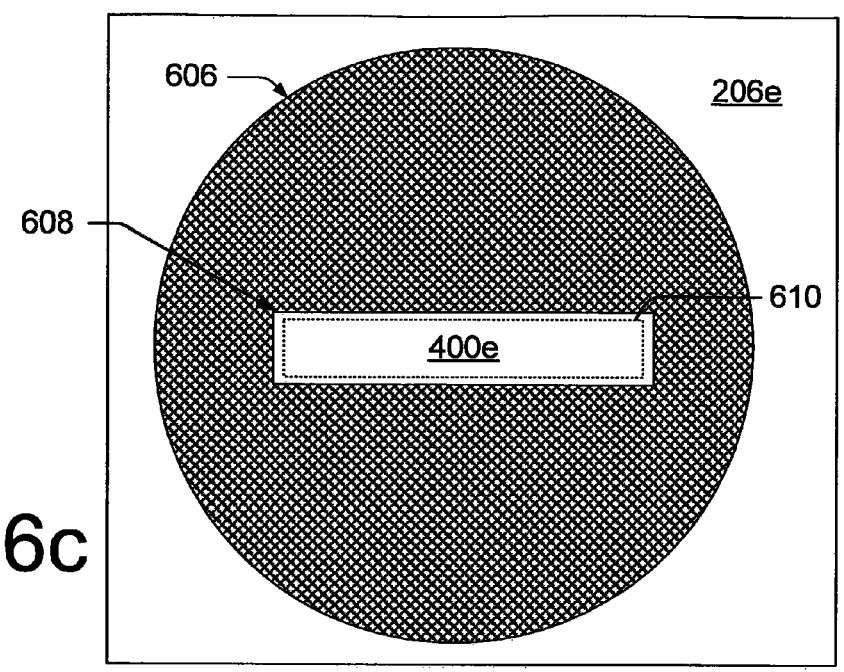

Nozzle opening 608 can define a pattern that is used to form a feature 400e within substrate 206e. Described another way, in some embodiments, the nozzle plate 606 has a nozzle opening 608 which circumscribes a footprint of a feature to be formed. For example, FIG. 6c shows exemplary nozzle plate 606 in more detail. Nozzle opening 608 circumscribes feature 400e which can be formed in the substrate 206e through the nozzle opening. In this embodiment, feature 400e has a rectangular pattern or footprint 610 defined by the nozzle opening 608. In this embodiment, nozzle opening 608 also circumscribes footprint 610 of the feature 400e. As will be apparent to the skilled artisan, such a configuration of the nozzle opening can allow assist gas to be supplied to essentially the entire area of the first surface of the substrate through which the feature is to be formed.

Figure 6D:
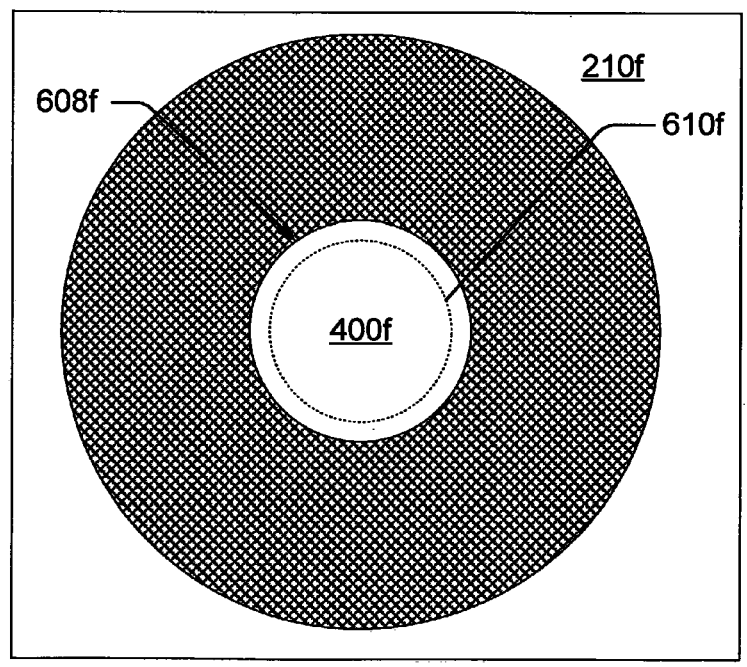

FIG. 6d shows another example of a nozzle opening defining a feature in a substrate. In this example, nozzle opening 608f is round and can define a circular feature 400f, such as a via, which can be formed into the substrate's first surface 210f where the feature has a footprint 610f. Other suitable nozzle plate configurations will be recognized by the skilled artisan.

Figure 7A:
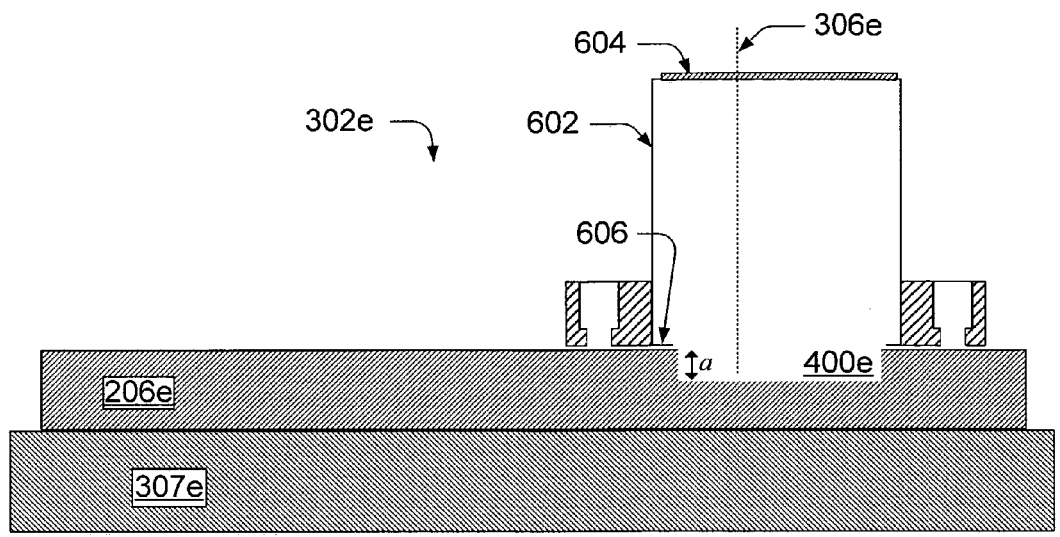
FIGS. 7a–7c show front elevational views of a portion of an exemplary laser machine in accordance with one exemplary embodiment.
Figure 7B:
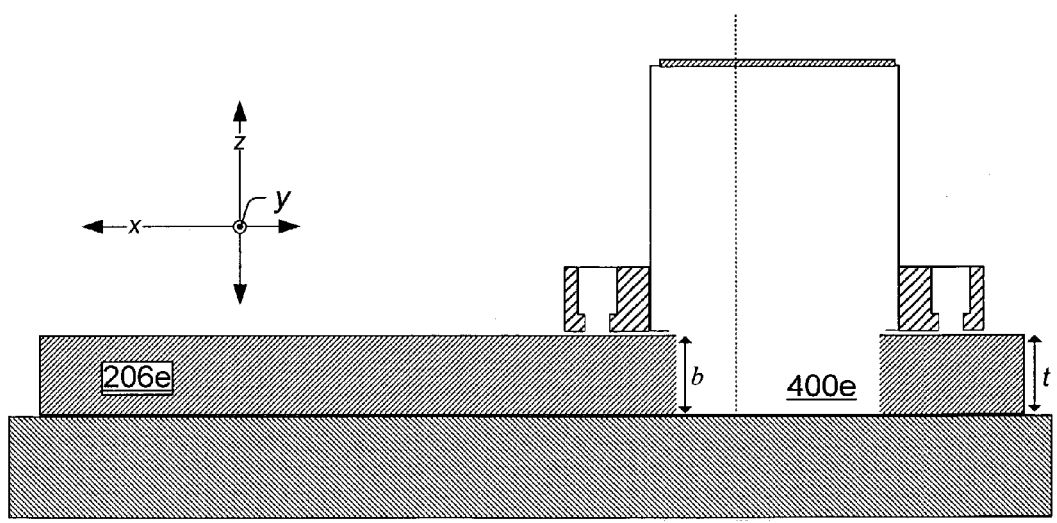
Figure 7C:
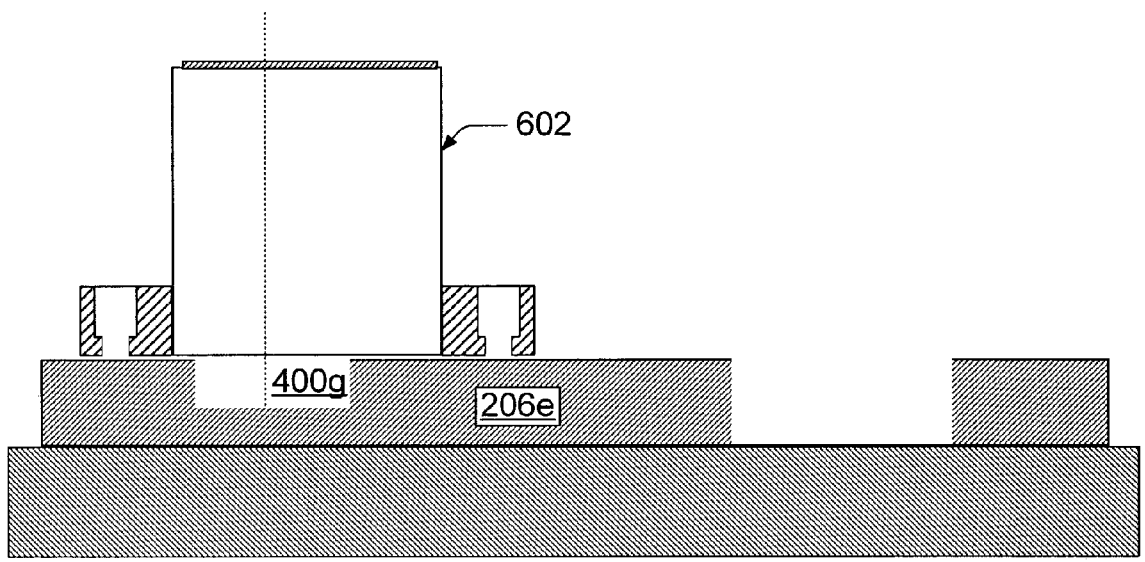

FIGS. 7a–7c show one suitable implementation for forming feature 400e utilizing laser machine 302e as shown in FIGS. 6a–6c. In this implementation, laser beam 306e can pass through the chamber's window 604 and exit through the nozzle opening 608 (shown FIG. 6b) of nozzle 606 to strike substrate 206e. In this implementation, the substrate 206e comprises a wafer comprised of multiple dies. Further, in this implementation, features can be formed into individual die(s) before dicing the wafer.

As shown in FIG. 7a, substrate 206e is positioned on fixture 307e. Any suitable positioning means can be utilized to hold the substrate relative to the fixture. Examples include, but are not limited to, physical clamps and vacuum pressure.

In some implementations, fixture 307e can be configured to move the substrate along the x, y and/or z coordinates as desired.

In some of these implementations, the laser machine 302e can be configured to allow the chamber 602 to move with the fixture 307e to maintain the fixture relative to a portion of the substrate 206e. Alternatively or additionally, the configuration of window 604 and nozzle opening 608 (as shown in FIG. 6) can allow laser beam 306e to be moved during feature formation while the chamber and substrate remain stationary. Some additional implementations can move both the substrate and the laser beam during feature formation.

Some implementations may remove substrate material utilizing a first set of laser machining conditions until a predetermined condition or parameter is met, and then remove additional substrate material utilizing a second different set of laser machining conditions. Some laser machining conditions will be described in more detail below. In some implementations, predetermined conditions can include feature depth, aspect ratio of the feature, and substrate temperature, among others.

In one such example, FIG. 7a shows feature 400e formed part way through the substrate. In this implementation feature 400e can be formed to a first feature depth a under a first set of laser machining conditions.

A second set of laser machining conditions can be used to form the feature to a second feature depth b, an example of which can be seen in FIG. 7b. In this implementation feature depth b equals the thickness t of the substrate and so feature 400e becomes a through feature.

FIG. 7c shows chamber 602 repositioned relative to the substrate. Another feature 400g is being formed into the substrate 206e.

As mentioned above various laser machining conditions can be utilized in forming a feature. Laser machining conditions can comprise among others, laser beam conditions and assist gas conditions. Laser beam conditions include, but are not limited to, laser beam scan rate, laser beam frequency, laser beam power, laser beam wavelength, and laser beam diameter. Assist gas conditions include, but are not limited to, assist gas composition, assist gas flow, assist gas temperature, and assist gas pressure.

In one embodiment, a feature can be formed utilizing first laser beam conditions until a predetermined condition is met, and then a further feature depth can be achieved under a second different set of laser beam conditions. For example, a laser beam wavelength of about 1100 nm can be utilized until the predetermined condition is met. This can be followed by a second laser beam wavelength of about 355 nm to remove additional material. Such an exemplary embodiment can take advantage of the various cutting properties of different wavelength lasers.

Laser beams having any suitable power density can be utilized in the described embodiments. In some exemplary embodiments, the laser conditions can establish a laser beam with a peak power density of greater than 1 $GW/cm^2$, with one exemplary embodiment having a peak power density of about 4.78 $GW/cm^2$. The laser machine, in various embodiments, can generate the laser beam in pulses in any suitable range of values. In some embodiments, pulse values range from about 1 kilohertz (kHz) to about 200 kHz. In one embodiment the pulse rate is about 20 kHz. Other satisfactory embodiments can use rates below and above the range given here. The laser beam pulse width can be about 1 to 100 nanoseconds, with one exemplary embodiment using about 20 nanoseconds.

The movement of the laser beam relative to the substrate per unit of time is referred to in this document as the laser scan rate. Exemplary embodiments can utilize a laser scan rate of about 1 to about 1000 millimeters/second (mm/sec). Some exemplary embodiments can utilize a laser scan rate of about 10 to about 300 mm/sec with other exemplary embodiments utilizing about 100 mm/sec.

Assist gas can be supplied at various delivery pressures and velocities. For example, some embodiments can utilize higher flow rates as feature depth increases. In some of these embodiments, the flow rate can be increased in a linear relationship to feature depth. Other suitable embodiments can use other relationships. Exemplary embodiments can utilize various assist gases. In some embodiments, the assist gas can comprise a halide or a halogen containing gas. Exemplary assist gases can comprise, but are not limited to halocarbons and sulfur hexafluoride. 1,1,1,2 tetrafluoroethane can comprise one such exemplary assist gas.

In one exemplary embodiment the assist gas can comprise a halogen precursor, at least some of the molecules of which can be ionized or disassociated by laser energy in the interface area. In a further exemplary embodiment, the assist gas can dissociate or ionize in an extremely hot environment around the laser energized region and can react with energized substrate material to form, at least in part, one or more volatile compounds. This process can decrease the incidence of redeposition and/or result in compounds that are more easily removed by an extraction system.

In some embodiments, the assist gas may comprise a single compound. Other embodiments, may supply an assist gas comprising a combination of compounds, such as air, nitrogen and/or water. In one such example, an assist gas, such as a halocarbon, may be delivered with other assist gases such as nitrogen, or ambient air. In some embodiments, such a combination can be utilized to reduce the number of molecules of the halocarbon used during laser machining of the feature. Other such embodiments may utilize such a mixture to provide a high gas assist flow rate while limiting the amount of halocarbon assist gas used to achieve the high flow rate.

Still other embodiments may deliver assist gas according to a first set of assist gas conditions during a portion of the laser machining process, and then provide a second different set of assist gas conditions for another portion of the laser machining process. In one such example, assist gas can be supplied at a first flow rate as substrate is removed to a first feature depth and then the assist gas can be delivered at a second higher rate.

In some embodiments, assist gas can be supplied at a flow rate sufficient to be an excess reagent in the interface region. In one exemplary embodiment, where the assist gas comprises 1,1,1,2 tetrafluoroethane, the gas assist nozzle(s) deliver the assist gas at a flow rate in a range of about 0.5 standard cubic feet per hour to about 20 standard cubic feet per hour. A further embodiment supplies about 5 standard cubic feet per hour of 1,1,1,2 tetrafluoroethane.

In some embodiments utilizing assist gases comprised of multiple compounds, a reactive assist gas component or one that is otherwise consumed by the laser machining process may be supplied at a desired level. The desired level in one example can be a level which maintains the reactive component(s) of the assist gas as an excess reagent. This reactive component may be supplied in combination, with other assist gas compounds, which are not consumed significantly in the laser machining process which in some embodiments may be termed "carrier gas(es)". In some of these embodiments, the consumed and non-consumed compounds may comprise assist gas delivered until a predetermined condition is met. The ratio of the compounds delivered in the assist gas may then be altered. In one such example, nitrogen may be supplied in a ratio of about 10 to 1 with 1,1,1,2 tetrafluoroethane until a first feature depth is attained. The amount of nitrogen is then increased to provide a ratio of about 20 to 1 for subsequent substrate removal.

In some embodiments a flow rate sufficient to supply the reactive component as an excess reagent may change according to other changing laser machining conditions. For example, increased laser power with increasing feature depth may be accompanied by increased assist gas flow to maintain the same level of reagent molecules in the interface region. Further, some embodiments may decrease laser beam wavelength and/or power as a desired feature depth is approached. The change in the laser beam may be accompanied by a corresponding reduction in assist gas flow.

Adjusting laser machining conditions during feature formation can allow some of the implementations to readily achieve desired features. Some implementations may change the laser beam conditions and the assist gas conditions with increasing feature depth. For example, a feature can be formed while both the laser beam power and the assist gas flow rate are increased. In one such example, the laser beam conditions and the assist gas conditions are both changed multiple times and/or continually in relation to increasing feature depth.

CONCLUSION

The described embodiments can utilize a laser beam to form a feature into a substrate. In several embodiments, the laser beam cuts with greater efficiency and speed by supplying an assist gas to the interface area where the laser beam energizes substrate material. In particular, the laser beam, when supplied with assist gas, can form more uniform cuts with higher aspect ratios than existing technologies. Additionally, the cuts can be maintained closer to desired conditions and can have less variation in their dimensions, in some embodiments. Some of the described embodiments can form narrower cuts than present and past technology and the speed and efficiency of those cuts can be maintained through the depth of the cut, while forming a higher quality product than existing technologies. Some of the described embodiments form features having these characteristics by changing the laser machining conditions during feature formation.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A semiconductor substrate processing method comprising:
    positioning a substrate relative to a laser machine;
    energizing, with a laser beam produced by the laser machine, a portion of the substrate to promote removal of at least some substrate material to form a desired feature into the substrate;
    introducing an assist gas at a given flow rate proximate to an energized portion of the substrate;
    changing laser machining conditions during feature formation, said laser machining conditions comprising changing a laser beam wavelength after a predetermined condition is met, said predetermined condition comprising a predetermined feature depth in the substrate; and
    increasing the flow rate of the assist gas as feature depth increases in the substrate, wherein said act of increasing includes increasing the flow rate when a first predetermined feature depth is reached.

2. The method of claim 1, wherein said act of introducing is achieved via a nozzle which has a pattern which circumscribes a footprint of the feature.

3. The method of claim 1, wherein said act of introducing comprises introducing an assist gas comprising a single compound.

4. The method of claim 1, wherein said act of introducing is achieved via a nozzle which has a pattern which circumscribes a footprint of the feature and wherein the nozzle remains fixed relative to the substrate during formation of the feature.

5. The method of claim 1, wherein said act of introducing is achieved via one or more nozzles which are moved relative to the substrate during said act of energizing.

6. The method of claim 1, wherein said act of introducing is achieved via one or more nozzles which remain generally fixed relative to the substrate during said act of energizing.

7. The method of claim 1, wherein said act of introducing is achieved via one or more nozzles which are moved along a path relative to the substrate which generally corresponds to a pattern of movement of the laser beam relative to the substrate during said act of energizing.

8. The method of claim 1, wherein said act of energizing and said act of introducing form a through feature in the substrate.

9. The method of claim 1, wherein said act of increasing comprises increasing the flow rate in a linear relationship to feature depth.

10. The method of claim 1, wherein said act of increasing comprises increasing the flow rate multiple times as feature depth increases in the substrate.

11. The method of claim 1, wherein said act of increasing comprises increasing the flow rate corresponding to an increase in laser beam power.

12. The method of claim 1, wherein said act of increasing comprises increasing the flow rate and changing at least one other different laser machining parameter.

13. A method comprising:
    positioning a substrate proximate a laser machine, wherein the substrate has a thickness defined by a first surface and a generally opposing second surface; and,
    cutting the substrate by directing a laser beam at the first surface of the substrate and introducing an assist gas proximate to a region of the substrate contacted by the laser beam, wherein the assist gas is introduced at a higher rate as the laser beam cuts through an increasing percentage of the thickness of the substrate, wherein act of cutting further comprises changing at least one other laser machining condition as the laser beam cuts through an increasing percentage of the thickness of the substrate, said at least one other laser machining condition comprising a laser beam wavelength.

14. The method of claim 13, wherein said act of introducing an assist gas comprises introducing an assist gas comprised of multiple assist gases.

15. The method of claim 14, wherein said act of introducing an assist gas comprised of multiple assist gases comprises introducing at least one halocarbon assist gas and at least one relatively non-reactive assist gas.

16. The method of claim 14, wherein said act of introducing an assist gas comprised of multiple assist gases comprises introducing a minor percentage of a halocarbon gas and a major percentage of a carrier gas.

17. The method of claim 13, wherein said act of cutting forms a feature in the substrate that is generally free of redeposited substrate material.

18. The method of claim 13, wherein act of cutting forms a feature that is defined, at least in part, by a first sidewall and a second generally opposing sidewall, wherein each of the first and second sidewalk is essentially orthogonal to the first surface.

19. The method of claim 13, wherein act of cutting forms a blind feature having an aspect ratio ranging from about 10 to about 20.

20. The method of claim 13, wherein act of cutting forms a through feature having an aspect ratio ranging from about 10 to about 20.

21. A method comprising
positioning a substrate proximate a laser machine configured to emit a laser beam, the substrate having a thickness between a first surface and a generally opposing second surface;
directing the laser beam at the first surface to form a feature into the substrate through the first surface, wherein the act of directing comprises changing at least one laser beam parameter with increasing feature depth, said at least one laser beam parameter comprising a laser beam wavelength;
flowing an assist gas proximate a portion of the first surface at which the laser beam is directed; and,
increasing the flow rate of the assist gas as the feature is formed through an increasing percentage of the thickness of the substrate.

22. The method of claim 21, wherein the act of increasing the flow rate comprises increasing the flow rate from a first flow rate to multiple higher flow rates.

23. The method of claim 21, wherein the act of increasing the flow rate comprises increasing the flow rate from a first flow rate in a linear relationship to feature dept.

24. A method of processing a semiconductor substrate comprising:
removing substrate material from a substrate at a first depth relative to a first surface of the substrate while delivering an assist gas at a first flow rate for a first set of laser beam conditions comprising a first laser beam wavelength; and,
removing substrate material at a second greater depth while delivering the assist gas at a second higher flow rate for a second set of laser beam conditions comprising a second laser beam wavelength.

25. The method of claim 24, wherein the act of removing substrate material from a substrate at a first depth and the act of removing substrate material at a second depth both comprise removing substrate material at substantially the same rate.

26. The method of claim 24, wherein the act of removing substrate material at a second depth comprises changing at least one laser beam parameter utilized far removing substrate material from a substrate at a first depth.

27. A method of laser micromachining a substrate comprising:
forming a feature into a substrate by directing a laser beam at a first surface of the substrate;
supplying an assist gas to substantially the entire area of the first surface through which the feature is to be formed without positioning the substrate in a chamber; and,
moving the laser beam relative to the substrate to form the feature, wherein said act of supplying is achieved via a nozzle which has a pattern which circumscribes a footprint of the feature and wherein the nozzle remains fixed relative to the substrate during formation of the feature.

28. The method of claim 27, wherein said act of supplying comprises supplying an assist gas at a first rate and then supplying the assist gas at a second higher rate as a depth of the feature increases.

29. A method comprising:
first laser machining a feature into a substrate to a first feature depth at a first set of laser team conditions and a first set of assist gas conditions; and,
after the first laser machining, second laser machining the feature into the substrate to a second feature depth at a second different set of laser beam conditions and a second different set of assist gas conditions, said second different set of laser beam conditions comprising a laser beam wavelength that is different from a laser beam wavelength used as part of said first set of laser beam conditions.

30. The method of claim 29, wherein said act of second laser machining increases a power of the laser beam and a flow rate of assist gas relative to the first act of laser machining.

31. A method of laser micromachining a substrate comprising:
at a first laser beam wavelength, first laser machining a feature into a substrate to a first feature depth while supplying assist gas to the substrate according to a first set of assist gas conditions; and,
after the first laser machining, at a second laser beam wavelength, second laser machining the feature into the substrate to a second feature depth while supplying assist gas to the substrate according to a second different set of assist gas conditions.

32. The method of claim 31, wherein the second act of laser machining comprises supplying assist gas at a flow rate which is different from a flow rate at which assist gas is supplied during the first act of laser machining.

33. The method of claim 31, wherein the second act of laser machining comprises supplying assist gas at a temperature which is different from a temperature at which assist gas is supplied during the first act of laser machining.

34. The method of claim 31, wherein the second act of laser machining comprises supplying assist gas having a composition which is different from a composition of assist gas supplied during the first act of laser machining.

* * * * *

UNITED STATES PATENT AND TRADEMARK OFFICE
CERTIFICATE OF CORRECTION

PATENT NO. : 7,754,999 B2  Page 1 of 1
APPLICATION NO. : 10/437378
DATED : July 13, 2010
INVENTOR(S) : Jeffrey R. Pollard It is certified that error appears in the above-identified patent and that said Letters Patent is hereby corrected as shown below:

In column 10, lines 32-33, in Claim 10, delete "increasingcomprises" and insert -- increasing comprises --, therefor.

In column 11, line 7, in Claim 18, delete "sidewalk" and insert -- sidewalls --, therefor.

In column 11, line 36, in Claim 23, delete "dept." and insert -- depth. --, therefor.

In column 11, line 55, in Claim 26, delete "far" and insert -- for --, therefor.

In column 12, line 19, in Claim 29, delete "team" and insert -- beam --, therefor.

Signed and Sealed this

Twelfth Day of October, 2010

David J. Kappos
*Director of the United States Patent and Trademark Office*